US009056777B2

(12) United States Patent
Markovic et al.

(10) Patent No.: US 9,056,777 B2
(45) Date of Patent: Jun. 16, 2015

(54) BENT CARBON NANOTUBES AND METHODS OF PRODUCTION

(75) Inventors: Nina Markovic, Baltimore, MD (US); Christopher A. Merchant, Baltimore, MD (US); James R. Medford, Tequesta, FL (US)

(73) Assignee: The Johns Hopkins University, Baltimore, MD (US)

(*) Notice: Subject to any disclaimer, the term of this patent is extended or adjusted under 35 U.S.C. 154(b) by 0 days.

(21) Appl. No.: 13/119,875

(22) PCT Filed: Oct. 19, 2009

(86) PCT No.: PCT/US2009/061165
§ 371 (c)(1),
(2), (4) Date: Mar. 18, 2011

(87) PCT Pub. No.: WO2010/059325
PCT Pub. Date: May 27, 2010

(65) Prior Publication Data
US 2011/0171111 A1   Jul. 14, 2011

Related U.S. Application Data

(60) Provisional application No. 61/106,333, filed on Oct. 17, 2008.

(51) Int. Cl.
*C01B 31/00* (2006.01)
*B01J 19/08* (2006.01)
(Continued)

(52) U.S. Cl.
CPC ............ *C01B 31/0226* (2013.01); *B82Y 30/00* (2013.01); *B82Y 40/00* (2013.01); *C01B 31/0233* (2013.01); *C01B 31/0253* (2013.01)

(58) Field of Classification Search
USPC ........ 423/447.1–447.3, 445 B; 977/742–754, 977/842–848; 428/367; 204/164; 264/438; 425/174.6
See application file for complete search history.

(56) References Cited

U.S. PATENT DOCUMENTS 6,750,438 B2    6/2004  Jordan
6,835,613 B2 * 12/2004  Schlaf .......................... 438/199
(Continued)

FOREIGN PATENT DOCUMENTS

WO    WO 03/004410    *  1/2003  ............. C01B 31/02

OTHER PUBLICATIONS

Wei, et al., Stability of carbon nanotubes under electric field studied by scanning electron microscopy, Appl. Phys. Lett. 2001; 79: 4527-4529.*

(Continued)

*Primary Examiner* — Daniel C McCracken
(74) *Attorney, Agent, or Firm* — Venable LLP; Henry J. Daley; David M. Klecyngier (57) ABSTRACT

A method of producing carbon nanotubes includes directing a flow of a gas over a substrate to provide growth of at least one carbon nanotube in a carbon-nanotube-growth region of the substrate; applying an electric field to the carbon-nanotube-growth region of the substrate after the at least one carbon nanotube has begun to grow in the carbon-nanotube-growth region, the electric field being substantially in a first direction in the carbon-nanotube-growth region; and changing the electric field at a preselected time to be substantially in a second direction in the carbon-nanotube-growth region during growth of the at least one carbon nanotube. The second direction is different from the first direction resulting in a bend substantially at a selected position of the at least one carbon nanotube, the method of producing carbon nanotubes providing the production of the at least one carbon nanotube having at least one bend substantially at a selected position along the at least one carbon nanotube.

16 Claims, 3 Drawing Sheets

(51) Int. Cl.
*B29C 53/00* (2006.01)
*B82Y 30/00* (2011.01)
*B82Y 40/00* (2011.01)
*C01B 31/02* (2006.01)

(56) References Cited

U.S. PATENT DOCUMENTS

| | | | |
|---|---|---|---|
| 7,359,694 B2 | 4/2008 | Przybysz | |
| 2002/0114949 A1* | 8/2002 | Bower et al. | 428/401 |
| 2007/0114120 A1 | 5/2007 | Konesky | |
| 2007/0207318 A1* | 9/2007 | Jin et al. | 428/408 |
| 2007/0243326 A1 | 10/2007 | Burke et al. | |

OTHER PUBLICATIONS

International Search Report for PCT/US2009/061165.
Nojeh, A; Ural, A; Pease, R.F. and Dai, H. Electrice-field directed growth of carbon nanotubes in two dimensions. J. Vac. Sci, Technol. B 22(6), Nov./Dec. 2004, pp. 3421-3425.
Bethune, D. et al., *Nature,* 363, 605-607 (1993).
Bozovic, D., Bockrath, M., Hafner, J. H., Lieber, C. M., Park, H., Tinkham, M., *Appl. Phys. Lett.,* 78, 3693-3695 (2001).
Cassell, A., et al. *Science,* 283, 512 (1999).
Dekker, C., *Phys Today,* 22-28, (1999).
Franklin, N.R., Dai, H., *Adv. Mater,* 12, 890-894 (2000).
Gu, Z., Peng, H., Hauge, R. H., Smalley, R. E., and Margrove, J. L., *Nano Lett.,* 2, 1009-1013 (2002).
Huang, X. Y., McLean, R. S., Zheng, M. *Anal. Chem.,* 77, 6225-6228, 2005.
Kong J. Soh, H. T., Cassell, A. M., Quate, C. F., Dai, H., *Nature.,* 395, 878 881 (1998).
Postma, H. W. Ch, Teepen, T., Yao, Z., Grifoni, M., Dekker, C., *Science.,* 293, 76-79 (2001).
Sun, X. Zaric, S., Daranciang, D., Welsher, K., Lu, Y., Li, X., and Dai, H., *J. Am. Chem. Soc.,* 130, 6551-6555 (2008).
Venema, L. C.; Wildoer, J. W. G.: Janssen, J. W.; Tans, S. J.; Tuinstra, H. L. J. T.; Kouwenhoven, L. P.; Dekker, C. *Science.,* 283, 52-55 (1999).
Zhang, Y., Chang, A., Cao, J., Wang, Q., Junm W., Li, Y., Morris, N., Yenimez, E., Kong, J., Dai, H., *Appl. Phys. Lett.,* 79, 3155-3156 (2001).

* cited by examiner

BENT CARBON NANOTUBES AND METHODS OF PRODUCTION

CROSS-REFERENCE TO RELATED APPLICATIONS

This application claims priority to U.S. Provisional Application No. 61/106,333 filed Oct. 17, 2008, the entire content of which is hereby incorporated by reference, and is a U.S. national stage application under 35 U.S.C. §371 of PCT/US20009/061165, filed Oct. 19, 2009, the entire contents of which are incorporated herein by reference.

This invention was made using U.S. Government support under National Science Foundation Grant Nos. DMR-0520491 and ECCS-0403964. The U.S. Government has certain rights in this invention.

BACKGROUND

1. Field of Invention

The current invention relates to methods of producing carbon nanotubes, and more particularly to methods of producing carbon nanotubes that have one or more bends, to the carbon nanotubes and products incorporating the carbon nanotubes.

2. Discussion of Related Art

Single walled carbon nanotubes (SWCNTs) have demonstrated immense potential for the utilization of their unique mechanical, chemical, optical and electrical properties (Dekker, C., Phys Today, 22-28, (1999)). The properties of long SWCNTs have been well documented and have resulted in numerous novel devices (Dresselhaus, M. S.; Dresselhaus, G.; Eklund, P. C. Science of Fullerenes and Carbon Nanotubes; Elsevier: San Diego, 1996). Short SWCNTs (<100 nm), however, have not been extensively studied, despite a wide variety of possible applications. At such short lengths, these ballistic one-dimensional conductors become subject to quantum confinement effects. In particular, their electronic structure and their optical properties depend on their length (Sun X., Zaric S., Daranciang D., Welsher K., Lu Y., Li X., and Dai, H., J. Am. Chem. Soc. 130, 6551-6555 (2008)), providing an opportunity to use the length to tune these properties. Ultrashort carbon nanotubes can be obtained by mechanical (Venema, L. C.; Wildoer, J. W. G.; Janssen, J. W.; Tans, S. J.; Tuinstra, H. L. J. T.; Kouwenhoven, L. P.; Dekker, C. Science 283, 52-55 (1999)) or chemical cutting (Gu, Z., Peng, H., Hauge, R. H., Smalley, R. E., and Margrave, J. L., Nano Lett. 2, 1009-1013 (2002)), in combination with standard nanoparticle sorting procedures (Sun X., Zaric S., Daranciang D., Welsher K., Lu Y., Li X., and Dai, H., J. Am. Chem. Soc. 130, 6551-6555 (2008); Huang, X. Y., McLean, R. S., Zheng, M. Anal. Chem. 2005, 77, 6225-6228). These methods yield a relatively sharp distribution of lengths, and the quantum confinement effects have been observed in their optical properties (Sun, et al., J. Am. Chem. Soc. 130, 6551-6555 (2008)). Quantum dot behavior has been demonstrated in carbon nanotubes with natural defects (Postma, H. W. Ch, Teepen, T., Yao, Z., Grifoni, M., Dekker, C., Science 293, 76-79 (2001)) and nanotubes that were intentionally bent using the tip of an atomic force microscope (Bozovic, D., Bockrath, M., Hafner, J. H., Lieber, C. M., Park, H., Tinkham, M., Appl. Phys. Lett. 78, 3693-3695 (2001)). The latter process is time consuming and limited by the size of the tip. Therefore, there is a need for improved methods of producing carbon nanotubes having selectively introduced defects such as bends.

SUMMARY

A method of producing carbon nanotubes according to some embodiments of the current invention include directing a flow of a gas over a substrate to provide growth of at least one carbon nanotube in a carbon-nanotube-growth region of the substrate; applying an electric field to the carbon-nanotube-growth region of the substrate after the at least one carbon nanotube has begun to grow in the carbon-nanotube-growth region, the electric field being substantially in a first direction in the carbon-nanotube-growth region; and changing the electric field at a preselected time to be substantially in a second direction in the carbon-nanotube-growth region during growth of the at least one carbon nanotube. The second direction is different from the first direction resulting in a bend substantially at a selected position of the at least one carbon nanotube, the method of producing carbon nanotubes providing the production of the at least one carbon nanotube having at least one bend substantially at a selected position along the at least one carbon nanotube.

Some embodiments of the current invention include carbon nanotubes produced according to methods according to the current invention.

A carbon nanotube according to an embodiment of the current invention has at least first and second bends with a substantially unbent length reserved there between. The carbon nanotube exhibits quantized energy levels for electrons traveling between the first and second bends which provide potential barriers to provide a degree of confinement of the electrons between the first and second bends. The transitions between the quantized energy levels are effected by absorption and emission of electromagnetic radiation.

A device for the production of carbon nanotubes includes a substrate; a first electrode formed on the substrate, the first electrode having a first end adapted to be connected to a voltage source and a second end free of an electrical connection and arranged proximate a carbon-nanotube-growth region; a second electrode formed on the substrate, the second electrode having a first end adapted to be connected to a voltage source and a second end free of an electrical connection and arranged proximate the carbon-nanotube-growth region; and a third electrode formed on the substrate, the third electrode having a first end adapted to be connected to a voltage source and a second end free of an electrical connection and arranged proximate the carbon-nanotube-growth region. The first, second and third electrodes are suitable to provide an electric field having a first direction in the carbon-nanotube-growth region and to change the electric field to have a second direction in the carbon-nanotube-growth region.

A method of producing bent carbon nanotubes includes providing a carbon nanotube, arranging the carbon nanotube such that one end is fixed while an axially opposing end is free, applying a time varying electric field to cause the carbon nanotube to bend.

BRIEF DESCRIPTION OF THE DRAWINGS

FIGS. 3A-3D show results of the chip method according to an embodiment of the current invention.

FIGS. 5A-5C show results of the electrophoresis method according to an embodiment of the current invention.

DETAILED DESCRIPTION

Some embodiments of the current invention are discussed in detail below. In describing embodiments, specific terminology is employed for the sake of clarity. However, the invention is not intended to be limited to the specific terminology so selected. A person skilled in the relevant art will recognize that other equivalent components can be employed and other methods developed without departing from the broad concepts of the current invention. All references cited herein are incorporated by reference as if each had been individually incorporated.

A method according to some embodiments of the current invention provides controlled growth of carbon nanotubes that can function similar to quantum nano-dots. A method of producing carbon nanotubes according to some embodiments of the current invention produces carbon nanotubes that have selectable electronic and optical properties. According to an embodiment of the current invention, we used multi-directional electric fields to manipulate the large axial dipole moment of the SWCNT to form precision bends in the carbon nanotubes. The term "bend" or "bent carbon nanotube" is intended to refer to a bend defect that affects the electrical and/or electromagnetic properties of the carbon nanotube. This process can instantaneously affect thousands of tubes, generating an abundant source of SWCNT that can be used like quantum dots of predetermined sizes. This method can also be used to produce custom-made quantum dot arrays, where the properties of each quantum dot can be tuned to obtain a very specific barcode-type optical signature ranging from visible frequencies to extremely high radio frequencies according to some embodiments of the current invention. This can provide a large variety of applications (including, but not limited to, medical applications, thermal imaging and photochemistry), by extending the range of useful quantum dot frequencies and offering customized absorption and emission signatures.

The typical diameter of a SWCNT is about 1 nanometer, which naturally confines the electrons in two dimensions, leaving them free to move only along the long axis. SWCNTs are therefore model systems for one-dimensional electron transport (Dekker, C., Phys Today, 22-28, (1999)). When the electrons are also confined in the third dimension, as they are in the ultrashort SWCNTs, the system becomes the classic one-dimensional particle-in-a-box. The energy levels in such a system are quantized due to the wave nature of the electrons. The characteristic energy levels can be calculated by solving the Schrödinger equation, yielding energy spacings equal to $E=hv_F/2L$, where h is Planck's constant, $v_F$ is the Fermi velocity, and L is the length of the nanotube (Dresselhaus, M. S.; Dresselhaus, G.; Eklund, P. C. Science of Fullerenes and Carbon Nanotubes; Elsevier: San Diego, 1996). In long nanotubes, the spacing between any two energy levels is much smaller than the thermal energy available to the electrons, and the level quantization due to confinement is not apparent. In contrast, the level spacing in ultrashort nanotubes is so large that the quantum confinement is apparent at room temperatures, opening up doors for a host of applications.

By changing the direction of the electric field during growth of carbon nanotubes, we can produce bends and kinks in the nanotubes in a controlled way according to some embodiments of the current invention. The ultrashort straight sections between the bends are subject to quantum confinement effects, each essentially having properties like a quantum dot with a characteristic length-dependent electronic and optical signature.

A method of producing carbon nanotubes according to an embodiment of the current invention includes directing a flow of a gas over a substrate to provide growth of at least one carbon nanotube in a carbon-nanotube-growth region of the substrate; applying an electric field to the carbon-nanotube-growth region of the substrate after the at least one carbon nanotube has begun to grow in the carbon-nanotube-growth region, the electric field being substantially in a first direction in the carbon-nanotube-growth region; and changing the electric field at a preselected time to be substantially in a second direction in the carbon-nanotube-growth region during growth of the at least one carbon nanotube. The second direction is different from the first direction resulting in a bend substantially at a selected position of the at least one carbon nanotube to produce at least one carbon nanotube having at least one bend substantially at a selected position along the at least one carbon nanotube. The flow of the gas over the substrate can be, for example, a chemical vapor deposition (CVD) process. For example, the gas can be methane or a gas mixture that includes methane. For example, a mixture of methane and hydrogen gas has been found to be suitable for some applications. However, the invention is not limited to these particular examples. Also, the substrate and/or carbon-nanotube-growth region can be heated to a suitable temperature for the particular application. The term "carbon-nanotube-growth region" is intended to include proximate the substrate, over the substrate, and/or overlapping with the substrate, depending on the particular example.

The term substrate is intended to have a broad meaning herein and can include structure and/or catalysts deposited and/or formed on a bare substrate. The bare substrate can be a silicon substrate, a sapphire substrate, a quartz substrate, strontium titanate, for example. However, the invention is not limited to only these examples. In some embodiments, the bare substrate may include a dielectric layer, for example, but not limited to, a $SiO_2$ layer. The substrate can also include a pattern of electrodes for producing electric fields according to some embodiments of the current invention. In addition, catalysts in various forms can be included within the general definition of the term "substrate." The catalysts can be, but are not limited to, layers, powders, nanoparticles, and/or patterned regions, for example. Catalysts can include, but are not limited to, $Fe(NO_3)_3.9H_2O$ in Alumina nanoparticles, a thin film and/or patterned thin film of cobalt, nickel or iron, for example.

The method according to some embodiments can include applying a substantially uniform electric field in the carbon-nanotube-growth region in the first direction. The method according to some embodiments can also include changing the electric field to another substantially uniform electric field in the carbon-nanotube-growth region in the second direction. In some embodiments, the method can include changing the magnitude of the electric field as a function of time. In some embodiments, the method can include changing the electric field as a periodic function of time. The amplitude and frequency of such a period function can be selected according to the particular application.

Methods of producing bent carbon nanotubes according to some embodiments of the current invention can produce a single bend, two bends or more than two bends per carbon nanotube. The positions of the bend can be selected with precision on the scale of the carbon nanotube length. For example, bends can be positioned within about ±10 nm in some examples. However, the general concepts of the current invention are not limited to this example of a degree of precision. Methods according to some embodiments of the current invention can be used to produce a plurality of bent carbon nanotubes substantially at the same time in a parallel manner. In some embodiments, this can provide an efficient mass production method. However, the scope of the invention also includes producing single and/or small numbers of bent carbon nanotubes, if desired.

Some embodiments of the current invention include one or more bent carbon nanotubes produced according the methods of the current invention. An embodiment of the current invention includes a carbon nanotube having at least first and second bends with a substantially unbent length reserved there between. The carbon nanotube exhibits quantized energy levels for electrons traveling between the first and second bends which provide potential barriers to provide a degree of confinement of the electrons between the first and second bends. The transitions between the quantized energy levels are effected by absorption and emission of electromagnetic radiation. The carbon nanotubes can provide narrow-band absorption and emission of electromagnetic radiation for a wavelength in the visible region of the electromagnetic spectrum, according to some embodiments of the current invention. The carbon nanotubes can provide narrow-band absorption and emission of electromagnetic radiation for a wavelength in the infrared region of the electromagnetic spectrum, according to some embodiments of the current invention. The carbon nanotubes can provide narrow-band absorption and emission of electromagnetic radiation for a wavelength in radio frequency region of the electromagnetic spectrum, according to some embodiments of the current invention. One can select the bends such that there is a desired length between the bends corresponding to the desired resonance energy. In addition, one or more carbon nanotubes can have multiple bends with selected lengths between adjacent bends to provide one or more desired resonance energies per carbon nanotube.

In other embodiments, bent carbon nanotubes can be produced from existing nanotubes by subjecting the existing nanotubes to applied electric fields. For example, the existing carbon nanotubes can be arranged such the one end is fixed, while the other end is free. An electric field and/or changing electric field can be applied to cause the carbon nanotubes to bend. For example, a pulsed field can be applied one or more times to the carbon nanotubes.

EXAMPLES

Experimental Details

In order to produce ultrashort SWCNT quantum dots and arrays, we took advantage of the fact that the SWCNTs large axial dipole moment allows them to align themselves in electric fields (Zhang, Y., Chang, A., Cao, J., Wang, Q., Junm W., Li, Y., Morris, N., Yenilmez, E., Kong, J., Dai, H., Appl. Phys. Lett. 79, 3155-3156 (2001)). This property has been used extensively to grow aligned SWCNT arrays for field emission applications and to align already grown SWCNTs for fabrication of devices. We use a Chemical Vapor Deposition (CVD) method of growth: methane gas is flown over a transition metal catalyst at high temperatures. The catalyst is $Fe(NO_3)_3.9H_2O$ in this example, supported in Alumina nanoparticles (Kong, J. Soh, H. T., Cassell, A. M., Quate, C. F., Dai, H., Nature 395, 878-881 (1998)). In contrast to the standard growth methods, we have the ability to apply the electric fields in different directions during growth. This allows us to sharply bend the tubes during growth multiple times. By knowing the typical growth rate, we can choose the length of the nanotube between two neighboring bends. The electric field was applied to the growing nanotubes in two different configurations. The first was a relatively crude process of applying an electric-field to a dot of bulk catalyst powder during the growth process. This has the advantage of being relatively straightforward to set up, and the easiest to scale up to an industrial application. The second process involved depositing the catalyst onto a chip with photolithographically fabricated electrodes. The advantages here are that the geometries were much easier to control and the voltage needed to create the necessary field is several orders of magnitude lower. In both cases, the electric-field strength was 1-2 V/μm. The exact gas flows, electric potentials and methods of attaching electrodes varied from run to run. We also performed different ways of preparing the catalyst, as detailed below. In other embodiments, we used electrophoresis to bend already grown nanotubes.

Bulk Powder Catalyst

Approximately 1-2 mg of catalyst was placed in an alumina crucible or "boat." Steel cotter rings were used to attach tungsten wires to the boat. The tungsten wires were run through the rubber stopper on the upstream end of the tube and through coaxial cables to the voltage source.

The gap between the electrodes was roughly the same as the width of the boat, ~1 cm, which required a voltage of 10-20 kV in order to create the necessary field strength. We took advantage of the voltage multiplying effect of a car ignition coil to turn 56V into 10-15 kV. We used a 555 timer chip to generate a square wave, which creates a very large dI/dt value, and sent that square wave to the car ignition coil, which acted as an inductor with a multiplication factor.

The sample was first heated to 910° C. under an argon gas flow of ~1 Standard Liter Per Minute (SLPM) for 25 minutes to prevent oxidation and to ensure a stable temperature. Following that, ~1 SLPM of $CH_4$ was flown for 10 minutes. During that time the electric-field was applied and its direction altered in various manners. Generally we used 3 electrodes situated with 2 at opposite sides of the boat on the down stream end and 1 at the center of the boat on the upstream end. The electric potentials were then alternated between the 3 electrodes, sometimes leaving one of them at a floating potential. At other times only 2 electrodes were used, with the second growth direction supplied by the gas flow direction.

The electric fields were generally applied for bursts of 7-45 seconds to allow for growth in the field direction or for millisecond bursts that were meant to bend the tubes but not to last for significant growth times.

After 10 minutes of growth, the $CH_4$ is turned off and replaced by ~1 SLPM argon flow for a 3 hour cool down. Following the cool down, the catalyst powder is placed into solution with 1,2-dichloroethane and dispersed onto a cleaned silicon wafer for examination by Atomic Force Microscope.

Powder Catalyst on Si Chip

Figure 1:
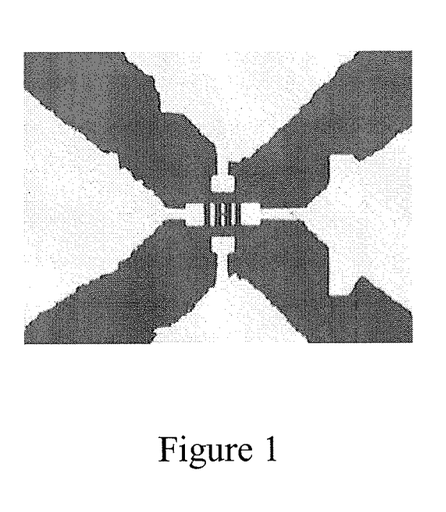
FIG. 1 is a silicon wafer with patterned Au electrodes for the production of bent carbon nanotubes according to an embodiment of the current invention. The gaps between "islands" in the center is 6 μm, as are the widths of the islands themselves. The large triangles on the outer edges extend to a diameter of ~3.5 mm, allowing for easy attachment to macroscopic electrodes.

This method according to an embodiment of the current invention uses the same catalyst as the bulk powder method. The chip itself was a 5 mm by 5 mm lightly doped Si wafer with a 1 μm thermally grown $SiO_2$ layer, patterned using standard photolithography (FIG. 1). 150 nm of Au was thermally evaporated on top of a 6 nm sticking layer of Cr in a pattern that allowed for 4 electrodes and 3 catalyst islands each separated by a 6 μm gap.

Following the evaporation, the chips were then re-patterned using photolithography to allow the placement of catalyst particles. The solution consisted of ~1 mg of the catalyst powder dissolved in 1 mL DI water and left to sit overnight. Prior to each use, this stock solution was sonicated for 1 hour. A droplet of this solution was dropped onto a 5 mm by 5 mm chip so that it covered the entire surface. The chip was then placed on a hot plate at a temperature of 115° C. for 12 minutes to ensure drying. Lift off was then preformed on the chips, making sure that catalyst only remained on the islands in the center of the chip.

The prepared chips were then placed in a chip holder, custom-made made from a machineable ceramic. The chip was fastened to the chip holder by small stainless steel screws and washers, which also doubled as the electrode contacts. The tungsten wires were attached to those same screws, thereby ensuring both mechanical stability and electrical channels.

Here we used two variations to achieve growth on a chip. One involves the use of sacrificial catalyst to prime the gas (Franklin, N. R., Dai, H., Adv. Mater. 12, 890-894 (2000)), which resulted in satisfactory tube growth. The other method involved interspersing Methane with $H_2$. We used approximately 0.5 SLPM of Hydrogen and 0.5 SLPM of Methane and observed good nanotube growth. Though this was more economical as far as the catalyst powder was concerned, it was less exact with our gas control equipment and was used infrequently.

For both methods, we heated the sample to 810° C. for 25 minutes under an Ar flow of ~1 SLPM. The decreased temperature was used to prevent the melting of the Au and the loss of adhesion by the Cr sticking layer. The gas flow was then switched to either the Hydrogen/Methane mix listed above or to the standard ~1 SLPM Methane for 10 minutes. During that time, a voltage of 12-48V was applied across the electrodes either in an attempt to make them align perpendicular to the flow of the gas or in alternating bursts to attempt kinking. The gas flow was then switched back to the ~1 SLPM of Ar for a 3 hour cool down.

This process was further improved by using chromium (Cr) leads instead of Au. 75 nm thick Cr leads did not melt or deform under the high temperatures in the furnace, which compensated for their higher resistivity. In order to get the required electric field in this configuration, voltage of 30-60V was needed.

To get the catalyst to adhere to the substrate, we suspended it in methanol. One "pinch" of catalyst was placed in a centrifuge tube containing 5 mL of methanol and sonicated for three minutes. Following that, two drops of the solution were placed onto a prepared chip with pre-fabricated electrodes. The solution was spin coated at 3 krmps for 30 seconds. To estimate the density of the catalyst particles between the electrodes, the chip was examined using an optical microscope at 100×. It generally took two to three separate spin coats to place several large catalyst particles between the leads. The chip was then placed in the custom-made chip holder. The chip holder was constructed from an alumina bar and a collection of stainless steel screws. The alumina bar was electrically insulating at the elevated temperatures of the tube furnace, while the stainless steel screws maintained mechanical contact between the alumina bar and the W wires.

Suspending the catalyst in methanol changed some of its properties. In order to grow SWCNTs on the chip, it was necessary to add Hydrogen ($H_2$) to the gas flow in this example. Due to the design of our gas system, we chose to measure the flow rate of $H_2$ in units of standard liters of $CH_4$ per minute. We balanced our system in such a way that both the $CH_4$ and the $H_2$ flowed at 1 SLPM of $CH_4$ and at 20 PSI each, with $H_2$ allowed to precede $CH_4$ initially. This ensured on our system that the gas flows mixed equally, and it resulted in SWCNT growth. During the growth, a 56V potential (~1.83 V/μm) was applied across various leads at various intervals. The growth lasted for 10 minutes.

Cobalt Film on Si Chip

The use of Co films was an attempt to place catalyst islands across the entire surface of the chip, thereby providing an abundant and regular source of carbon nanotubes according to an embodiment of the current invention. Thin layers of Co film had previously been shown to produce SWCNTs (D. Bethune et al., Nature 363, 605-607 (1993)). Arrays of 15 nm thick Co islands with a diameter of 3 μm were lithographically patterned across entire chips. Either 150 nm thick Co leads or 150 nm thick Cr leads were used in different runs. These leads were typically 30 μm apart, and the electric field was 0.5-1 V/μm. In this round of experiments we also used quartz wafers as well as Si wafers coated with $TiO_2$ or $Al_2O_3$.

Liquid Precursor Catalyst and Stamping on Chips

To further increase the number of viable sites for SWCNT growth, we used a liquid precursor catalyst (LPC). LPC was used with a PDMS stamp to apply a pattern rapidly onto a chip (Franklin, N. R., Dai, H., Adv. Mater. 12, 890-894 (2000); A. Cassell et al., Science 283, 512 (1999)). This catalyst had the added advantage of having been shown to grow aligned SWCNTs in the presence of electric fields (Zhang, Y., Chang, A., Cao, J., Wang, Q., Junm W., Li, Y., Morris, N., Yenilmez, E., Kong, J., Dai, H., Appl. Phys. Lett. 79, 3155-3156 (2001)). The PDMS stamps were custom made to print an array of micron sized islands. In order to use the stamp, it first had to be rendered hydrophilic. This was accomplished by $O_2$ etching the stamp (300 mTorr O2, 50 W, 3-4 minutes) and then placing it under water. The submersion in water served to maintain the effects of the $O_2$ etch. After etching, the stamp was spin coated with the LPC (3-4 krpms, 30 seconds). The stamp was then carefully applied to the prepared chip. Following that, the sample was placed into the tube furnace and baked at 466 C for 4-8 hours in Ar or air, depending on the trial. This served to drive off some of the heavier organic components of the LPC. The SWCNTs were grown for 10-20 minutes.

Electrophoresis

We have also bent already grown carbon nanotubes using electric fields in a tabletop environment. The carbon nanotubes in a solution are very susceptible to electric fields; the only thing preventing them from aligning with the fields would be contact with the surface of a chip. When in contact with the surface of the chip, the tubes are firmly anchored, and cannot be manipulated. If electric fields are applied in rapidly alternating directions while the tubes are suspended in a solution, the tubes would attempt to align in multiple directions as they descend to the surface. With part of the tube anchored, and part free, the free end could align in a direction differing from that of the anchored end, resulting in a bend.

In order to control the electric field, we used computer-controlled digital switching. This resulted in AC electric fields alternating between the x and y directions on the chip. The chip was patterned with two orthogonal sets of opposing electrodes, with gaps ranging from 12 µm to 50 µm. The most crucial aspect of this procedure was the preparation of the solution; there was a fine balance between a solution devoid of any objects at all, and one cluttered with catalyst residue and debris. The following procedure yielded good results:

1. Sonicate in a centrifuge tube approximately three medium sized grains of post-growth SWCNT/catalyst powder in 5 mL of 1,2-dichloroethane for 5 minutes.
2. Centrifuge the tube for five to seven minutes, to remove most of the larger debris. This step is critical; it controls the relative density of particles in the solution.
3. Decant the top 4 mL of the solution into a fresh tube, and dilute it back up to 5 mL This ensures a solution that has approximately the correct densities of SWCNTs and carbon debris.
4. Use the solution right away, preferably within two hours (after that, the SWCNTs clump together).

Three drops of the solution are then applied to the chip with pre-fabricated electrodes. Potentials of 1 Vpp and 3 MHz were applied for 10 seconds, the chip was rinsed with IPA, and blow dried with nitrogen gas.

Results and Discussions

Figure 2:
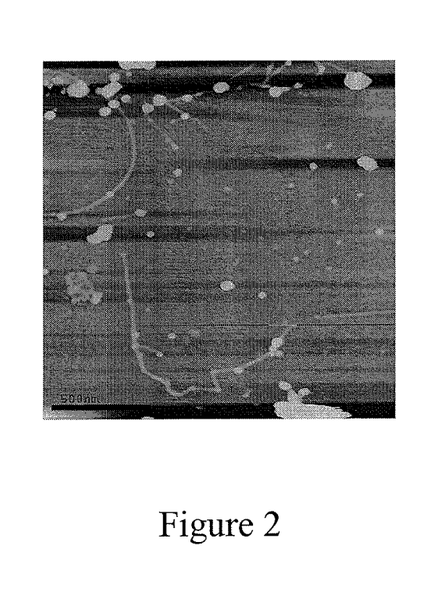
FIG. 2 is an atomic force microscope (AFM) image of a SWCNT on a chip, from the bulk powder method according to an embodiment of the current invention. Note the multiple bends in the lower tube. Note also that each kink is characterized by a brighter region. This brighter region represents a greater height, and is indicative of a defect similar to that of a bent drinking straw. The field direction was changed seven times in this case.
Figure 3A:
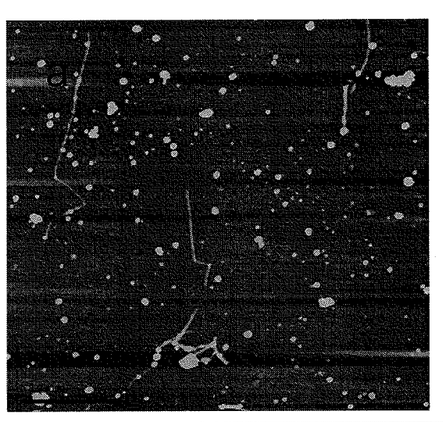
FIG. 3A is an AFM image of bent SWCNTs on a Si wafer.
Figure 3B:
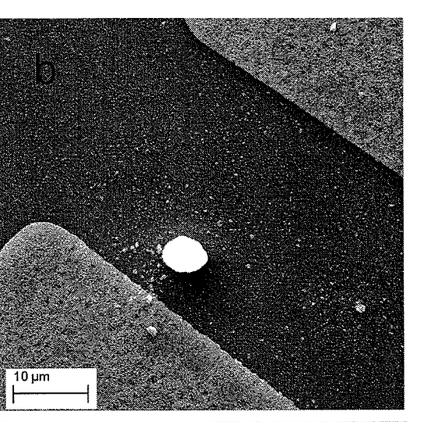
FIG. 3B is an SEM image of a catalyst particle on a Si Wafer. The two patterned electrodes are visible above and below the catalyst particle.
Figure 3C:
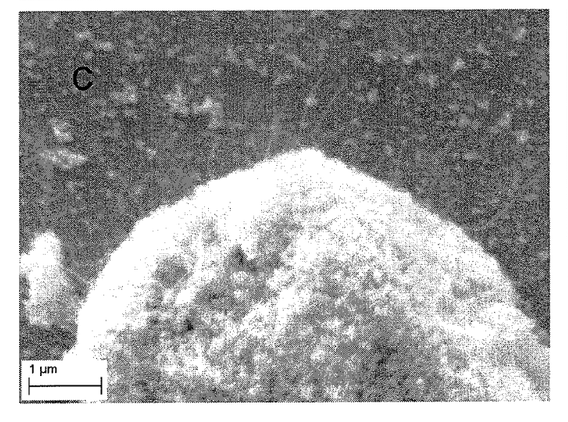
FIG. 3C is an SEM image of a catalyst particle on a Si Wafer. Note the curvature of tubes towards the upper right hand corner, in the direction of the applied electric field.
Figure 3D:
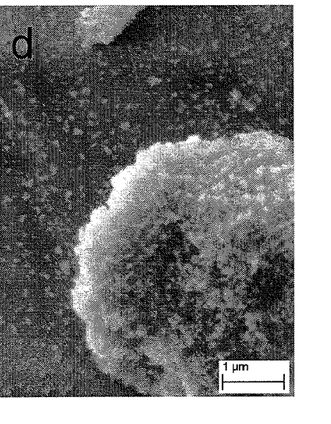
FIG. 3D is an SEM image of a catalyst particle on a Si Wafer. Note the curvature of tubes towards the electrode at the top of the image, in the direction of the applied electric field. One tube in particular can be seen growing from the left side of the particle, approximately one inch above the bottom of the figure, to the electrode.
Figure 4:
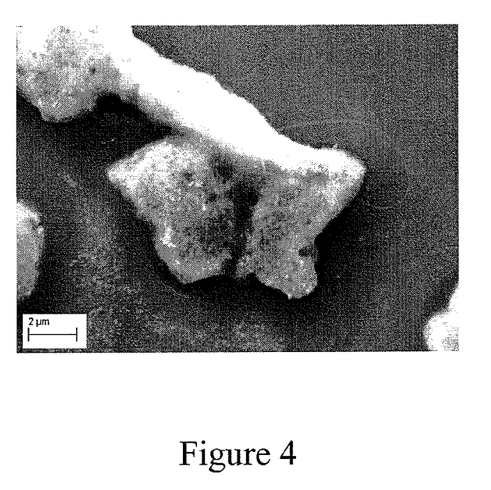
FIG. 4 shows an example of CNT growth from the LPC embodiment of the current invention. Note the tube that curls back on itself in the middle right portion of the image. This is most likely caused by the random motion of the tubes prior to contact with the surface.

The bulk powder method yielded multiple tubes with bends, and many tubes with multiple bends, as shown in FIG. 2. On some occasions, the number of bends corresponded to the number of times the field direction was altered, but not in all cases (this is reasonable, because not all nanotubes grow at the same time). However, the high voltages required for this method can be inconvenient and potentially unsafe for some applications.

Switching to the chip method allowed for a significant reduction in required voltage, but also provided a greater control of the electric fields. While the nanotubes could be aligned this way, merely alternating the electric fields would not kink the tubes. We found that the nanotubes move randomly in the gas flow until they are tagged down by the contact with the surface, and we had to provide a sufficient number of anchor points. The results from this method are shown in FIG. 3. Using the Co film as the catalyst resulted in fewer nanotubes overall. Using the LPC improved the situation, but the process parameters still need optimization.

Figure 5A:
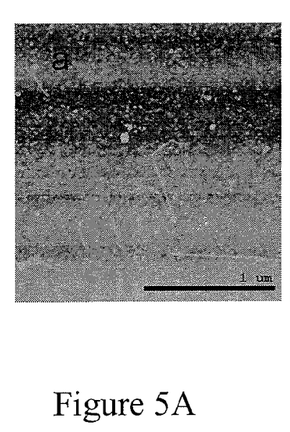
FIG. 5A is an AFM image of a SWCNT with two sharp bends.
Figure 5B:
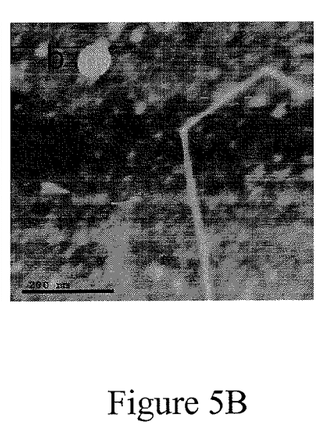
FIG. 5B is the same nanotube with higher magnification.
Figure 5C:
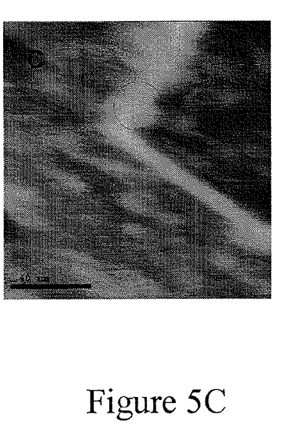
FIG. 5C is at even higher magnification; one can see additional two bends, approximately 9 nm apart (marked with a circle).

The electrophoresis method also yielded very interesting results. AFM analysis showed that we have successfully aligned SWCNTs and produced a large number of bent tubes. Some examples are shown in FIG. 5.

One surprising finding is that the number of kinks in the tubes did not seem to have a clear dependence on the frequency with which the electric field switched directions. It is possible that the switching frequency is too low, and that in 10-100 ms that it takes to change directions, most nanotubes that had begun to touch the surface would completely settle. One obvious solution is to increase the switching frequency.

Another solution would be to interfere with the binding of the SWCNT to the wafer's surface. That could be accomplished by either chemically functionalizing the SWCNT with a compound that did not adhere as rapidly to the surface, or by slowing the decent and binding of the SWCNT. This later technique might involve vibrating the sample during this procedure, thereby making a binding less likely while not interfering with the binding strength. We are currently investigating both approaches.

We have demonstrated that it is possible to bend SWCNTs in multiple locations using electric fields either during the nanotube growth or after the growth was completed in the above examples. We provided examples for several techniques and catalyst configurations and found that the bends can be placed in the nanotubes in a controlled way. However, the scope of the invention is not limited to these particular examples.

While the invention has been described and illustrated with reference to certain particular embodiments thereof, those skilled in the art will appreciate that various adaptations, changes, modifications, substitutions, deletions, or additions of procedures and protocols may be made without departing from the spirit and scope of the invention. It is intended, therefore, that the invention be defined by the scope of the claims that follow and that such claims be interpreted as broadly as is reasonable.

We claim:

1. A method of producing carbon nanotubes, comprising:
   directing a flow of a gas over a substrate to provide growth of at least one carbon nanotube in a carbon-nanotube-growth region of said substrate by a chemical vapor deposition (CVD) process, said substrate comprising a plurality of electrodes formed on a surface thereof;
   applying an electric field to said carbon-nanotube-growth region of said substrate using at least two of said plurality of electrodes after said at least one carbon nanotube has begun to grow in said carbon-nanotube-growth region, said electric field being substantially in a first direction in said carbon-nanotube-growth region; and
   changing said electric field at a preselected time to be substantially in a second direction in said carbon-nanotube-growth region using at least two of said plurality of electrodes during growth of said at least one carbon nanotube,
   wherein said second direction is different from said first direction resulting in a bend defect substantially at a selected position of said at least one carbon nanotube, said method of producing carbon nanotubes providing the production of said at least one carbon nanotube having at least one bend defect substantially at a selected position along said at least one carbon nanotube.

2. The method of claim 1, wherein said applying an electric field applies a substantially uniform electric field in said carbon-nanotube-growth region in said first direction.

3. The method of claim 1, wherein said changing said electric field provides a substantially uniform electric field in said carbon-nanotube-growth region in said second direction.

4. The method of claim 1, wherein said changing said electric field comprises changing a magnitude of said electric field as a function of time.

5. The method of claim 1, wherein said changing said electric field comprises changing said electric field as a periodic function of time.

6. The method of claim 1, wherein said directing said flow of gas is directing a flow of gas comprising methane.

7. The method of claim 6, wherein said directing said flow of gas is directing a flow of gas further comprising hydrogen.

8. The method of claim 1, wherein said substrate comprises a catalyst for carbon nanotube growth in said carbon-nanotube-growth region.

9. The method of claim 8, wherein said catalyst is formed in a preselected pattern in said carbon-nanotube-growth region.

10. The method of claim 8, wherein said catalyst is $Fe(NO_3)_3 \cdot 9H_2O$ in Alumina nanoparticles.

11. The method of claim 8, wherein said catalyst is a film of cobalt.

12. The method of claim 1, wherein said substrate comprises a pattern of electrical conductors arranged for said applying said electric field and for said changing said electric field.

13. The method of claim 1, wherein a plurality of carbon nanotubes, each having at least one bend defect therein, is produced in parallel.

14. The method of claim 1, further comprising changing said electric field at a second preselected time after the first-mentioned preselected time to be substantially in a third direction in said carbon-nanotube-growth region during growth of said at least one carbon nanotube, wherein said third direction is different from said second direction resulting in a second bend defect substantially at a second selected position of said at least one carbon nanotube, said method of producing carbon nanotubes providing the production of said at least one carbon nanotube having at least two bend defects substantially at first and second selected positions along said at least one carbon nanotube.

15. The method of claim 14, wherein a plurality of carbon nanotubes, each having at least two bend defects therein, is produced in parallel.

16. The method of claim 14, wherein the first-mentioned preselected time and the second preselected time are selected such that said at least one carbon nanotube has a length between said first and second bend defects that provide an energy level for absorption and emission of electromagnetic energy substantially at a preselected wavelength.

* * * * *